April 30, 1968 R. L. DELANOY ET AL 3,381,089
DATA TRANSMISSION APPARATUS
Filed Oct. 1, 1964
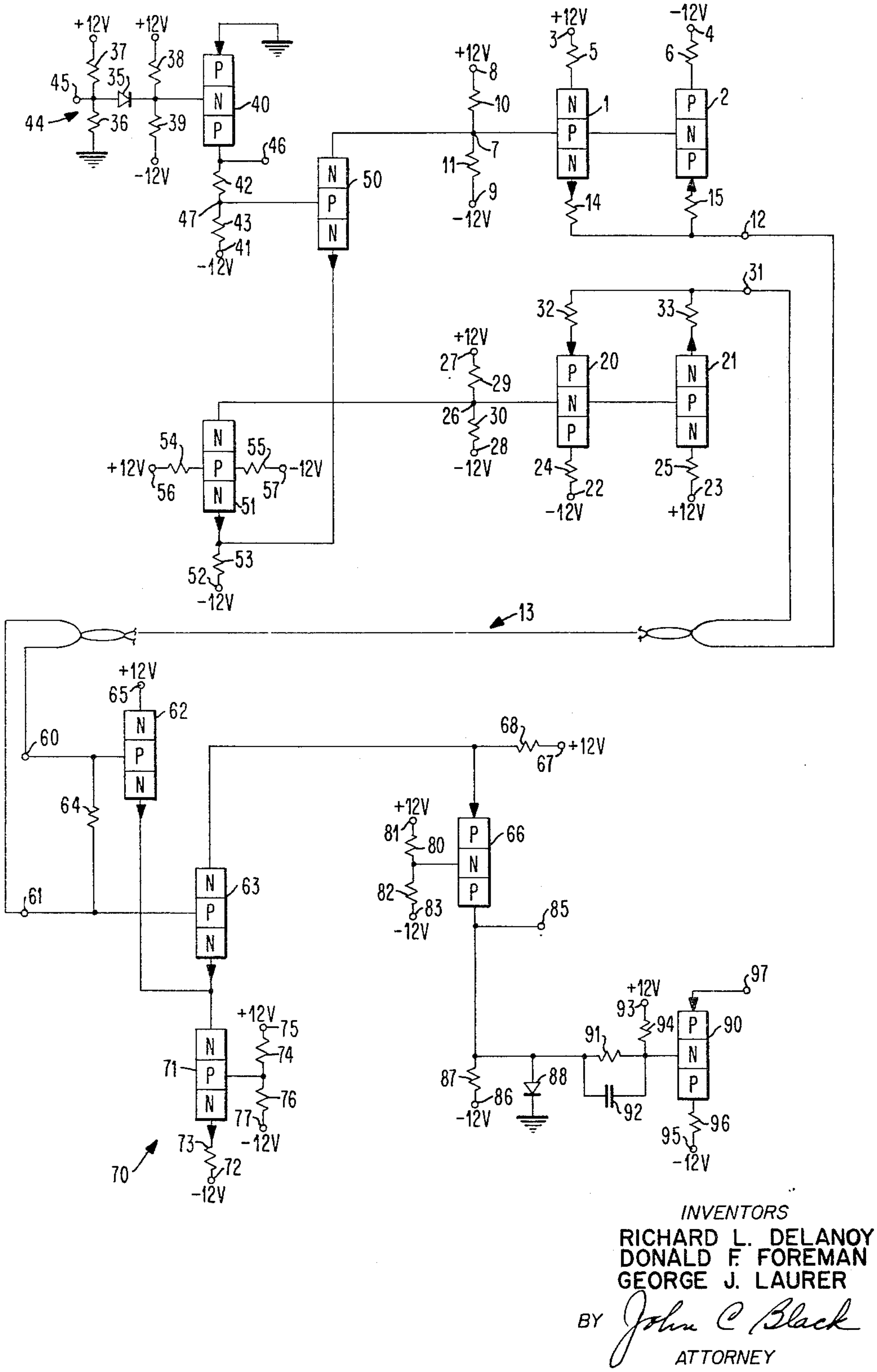
INVENTORS
RICHARD L. DELANOY
DONALD F. FOREMAN
GEORGE J. LAURER
BY John C Black
ATTORNEY United States Patent Office 3,381,089

Patented Apr. 30, 1968

3,381,089

DATA TRANSMISSION APPARATUS

Richard L. Delanoy, Huntsville, Ala., Donald F. Foreman, Vestal, and George J. Laurer, Endwell, N.Y., assignors to International Business Machines Corporation, New York, N.Y., a corporation of New York Filed Oct. 1, 1964, Ser. No. 400,828

10 Claims. (Cl. 178—70)

This invention relates generally to improvements in data transmission apparatus and, more particularly, to an improved digital transmission line driver-terminator circuit.

In data processing apparatus, difficulty has been experienced over the years in transmitting digital data at relatively high speeds over cables longer than a few hundred feet.

Frequency distortion, nonlinear amplitude distortion, delay distortion, severe ground shift, cross talk, noise and insertion loss are some of the more serious problems experienced in DC pulse transmission. Certain of the problems can be classified within two areas:

(1) DC pulse transmission at low frequencies and at moderate frequencies substantially in excess of 1200 baud at distances substantially greater than 200 or 300 feet and (2) DC pulse transmission at relatively high frequency, for example, 50 kilocycles to 1 megacycle over distances greater than a few hundred feet.

Typical commercial equipment in existence today frequently is characterized by relatively expensive and elaborate equipment for the transmission of even relatively low frequency data signals; for example, data transmission sets which are capable of transmitting data at the rate of 1200 baud over telephone lines, typically include circuits responsive to bivalued DC data pulses for transmitting data over telephone lines by frequency shift or phase shift techniques. Circuits must then be provided at the terminating end of the telephone line for changing the data from the frequency or phase shift form to bivalued DC pulse form. Even this apparatus exhibits severe reliability problems, and sophisticated, expensive circuitry is often provided.

When data is transmitted at rates substantially higher than 1200 baud, the equipment becomes even more sophisticated and costly.

Accordingly, it is a primary object of the present invention to provide an improved, data transmission drive and terminating circuit which is low in cost yet very reliable in operation.

In a preferred embodiment of the present invention, this object is achieved by providing an improved balanced line driver and line terminator. The improved driver is characterized by a first pair of transistors of opposite conductivity type with their base electrodes coupled to an input terminal which receives bivalued data signals referenced about ground and with their emitter electrodes coupled to one terminal at the drive end of a transmission line, and a second pair of transistors of opposite conductivity type with their base electrodes coupled to a second input terminal which receives similar data signals out-of-phase with respect to those at the first terminal and with their emitter electrodes coupled to a second terminal at the drive end of the line. The improved terminator is characterized by a pair of transistors of similar conductivity type operated as a differential amplifier with a constant current source input to their emitter electrodes. The collector electrode of one of the transistors is coupled to the emitter electrode of a common base amplifier which provides a constant current output to the terminator load. When the data signals to the improved driver correspond to one logical condition, one transistor in each transistor pair of the driver is energized to complete a series circuit including the latter transistors and an impedance which terminates the line in its characteristic impedance. This will cause one of the transistors of the differential amplifier to be energized and the other to be de-energized. When the data input signals correspond to the other logical condition, the other transistor in each pair in the driver circuit is energized to complete a series circuit including the latter transistors and the terminating impedance. This in turn changes the conductivity and nonconductivity conditions of the transistors in the differential amplifier of the improved terminator. With the differential amplifier in one state, a constant current of one predetermined level is applied to the terminator load by the common base amplifier in conduction. When the differential amplifier is in the opposite state, the common base amplifier is rendered nonconductive and the terminator load current is supplied from a constant voltage source through a load resistor in the collector circuit of the common base amplifier.

The improved driver-line-terminator circuit provides significantly improved results at low, moderately high, and very high data transmission rates without resorting to frequency or phase shift apparatus. Typical examples of data transmission which can be achieved reliably by the improved driver-terminator are as follows:

(1) 1$\mu$s pulse width ($\sim$400 kilobaud) over a maximum distance of approximately 3000 feet;

(2) 2$\mu$s pulse width ($\sim$200 kilobaud) over a maximum distance of approximately 5000 feet;

(3) 4 $\mu$s pulse width ($\sim$100 kilobaud) over a maximum distance of approximately 6000 feet;

(4) 8 $\mu$s pulse width ($\sim$50 kilobaud) over a maximum distance of approximately 9000 feet;

(5) 320 $\mu$s pulse width ($\sim$1200 baud) over a maximum distance of approximately 10 miles.

The improved circuit can tolerate high transmission line ground shafts, for example between $\pm$6 volts.

Accordingly it is another object to provide an improved driver-transmission line-terminator circuit which is not adversely affected by relatively wide ground shifts.

The foregoing and other objects, features and advantages of the invention will be apparent from the following more particular description of a preferred embodiment of the invention, as illustrated in the accompanying drawing.

The improved driver comprises a first pair of transistors 1 and 2 of opposite conductivity types. The collector electrodes of the transistors are connected to bias supply terminals 3 and 4 by way of resistors 5 and 6. The base electrodes of the transistors are coupled to a first input junction 7 which is connected to positive and negative bias supply terminals 8 and 9 by way of resistors 10 and 11. The emitter electrodes of the transistors are coupled to one input terminal 12 of a transmission line cable 13 by way of resistors 14 and 15.

The improved driver also includes a second pair of transistors 20 and 21 with their collector electrodes coupled to negative and positive bias supply terminals 22 and 23 by way of resistors 24 and 25. The base electrodes of the latter transistors are connected to an input junction 26 which is connected to positive and negative supply terminals 27 and 28 by way of resistors 29 and 30. The emitter electrodes of the latter transistors are connected to a second input terminal 31 of the transmission line cable 13 by way of resistors 32 and 33.

Means for applying out-of-phase bivalued data pulses to the input junctions 7 and 26 include a grounded emitter transistor amplifier 40 having its collector electrode coupled to a negative bias supply terminal 41 by way of a voltage divider comprising resistors 42 and 43. The amplifier 40 is provided with an input bias arrangement 44 including resistors 36–39, and a diode 35 which maintain the transistor at cutoff; and a low level negative input signal turns the transistor on. A second input terminal 46 is adapted to receive data signals from other types of circuit families wherein the bivalued signal levels are higher, for example, ground potential and a negative potential between −6 and −12 volts.

The junction 47 between the resistors 42 and 43 is connected to the base electrode of a transistor 50 which together with a transistor 51, forms a differential amplifier. The emitter electrodes of the transistors 50 and 51 are coupled to a negative bias supply terminal 52 by way of a common resistor 53. A voltage divider circuit including resistors 54 and 55 connected between positive and negative bias supply terminals 56 and 57 sets the bias on the base electrode of the transistor 51. When the potential level at the junction 47 is more positive than the potential on the base electrode of the transistor 51, transistor 50 conducts and transistor 51 is cut off. When the potential level at the junction 47 is more negative than that at the base electrode of the transistor 51, transistor 50 is cut off and the transistor 51 conducts.

Both of the transistors 50 and 51 are operated at cutoff or in Class A operation for high speed switching. When the transistor 50 conducts, it establishes a −1 volt potential at the junction 7; and, when it is cut off, a +1 volt potential exists at the junction 7. Similarly, when the transistor 51 conducts, the potential at the junction 26 is −1 volt; and, when it is cut off, the potential at the junction 26 is +1 volt.

When the voltage levels at the junctions 7 and 26 are +1 volt and −1 volt respectively, they establish a +.8 volt level and a −.8 volt level at the terminals 12 and 31 respectively, by way of transistors 1 and 20 respectively.

Alternatively, when the voltage levels at the junctions 7 and 26 and −1 volt and +1 volt respectively, they establish potential levels of −.8 volt and +.8 volt at the terminals 12 and 31 respectively, by way of the transistors 2 and 21. It will be noted that transistors 1 and 2 are energized alternatively, depending upon the momentary level of the signal at the junction 7. Transition periods between the signal levels are minimized by means of the high speed switching action of the Class A amplifiers 50 and 51. Similarly, the transistors 20 and 21 are energized alternatively, depending upon the momentary signal level at the junction 26.

The transmission line cable 13 includes a pair of output terminals 60 and 61 which are coupled respectively to the base electrodes of a pair of transistors 62 and 63 of the same conductivity type, operated as a differential amplifier. A resistor 64 terminates the transmission line 13 in its characteristic impedance.

The collector electrode of the transistor 62 is connected to a positive bias supply terminal 65; and the collector electrode of the transistor 63 is connected to the emitter electrode of a common base transistor amplifier 66 and to a positive bias supply terminal 67 by way of a resistor 68. The emitter electrodes of the transistors 62 and 63 are connected to a constant current source 70 including a common base transistor amplifier 71. The emitter electrode of the transistor 71 is coupled to a negative bias supply terminal 72 by way of a resistor 73 and the base electrode of the latter transistor is connected to a fixed bias-setting voltage divider comprising a resistor 74 connected to a positive bias supply terminal 75 and a resistor 76 connected to a negative bias supply terminal 77.

The transistor 66 includes a base electrode connected to a fixed bias setting voltage divider comprising a resistor 80 connected to a positive bias supply terminal 81 and a resistor 82 connected to a negative bias supply terminal 83.

The transistor 66 includes a collector electrode connected to a first output terminal 85 and connected to a negative bias supply terminal 86 by way of a resistor 87. A clamping diode 88 has its anode connected to the collector electrode of the transistor 66 and its cathode connected to ground potential. The collector electrode of the transistor 66 is also connected to the base electrode of an emitter follower 90 by way of a coupling resistor 91 and a speed-up capacitor 92. The base electrode of the emitter follower 90 is coupled to a positive bias supply terminal 93 by way of a resistor 94. The collector electrode of the emitter follower 90 is coupled to a negative bias supply terminal 95 by way of a resistor 96. The emitter electrode of the emitter follower 90 is connected to a second output terminal 97.

When data signals are applied to the input terminal 45, output signals are derived from the output terminal 97. When data signals are applied to the input terminal 46, corresponding output data signals are derived from the output terminal 85.

During the following brief description of the improved driver-line-terminator circuit, assume that input data signals are applied to the terminal 45 and that data output signals are derived from the output terminal 97. Let it be assumed further, that a logic "0" input data signal is a signal at the relatively negative level and that a logical "1" condition corresponds to an input signal at the relatively positive level. With a logical "0", or negative, input signal, the transistor 40 is turned on thereby to cause transistor 50 to conduct and the transistor 51 to be cut off. The −1 volt potential level at the junction 7 turns on the transistor 2 and the +1 volt potential level at the junction 26 turns on the transistor 21. A series circuit is established from the negative bias supply terminal 4 through resistor 6, transistor 2, resistor 15, the upper conductor of the cable 13, the terminating impedance 64, the lower conductor of the cable 13, resistor 33, the transistor 21, and the resistor 25 to the positive bias supply terminal 23.

The driver provides a voltage drop in the order of .6 volt or higher across the terminating impedance 64 to assure reliable operation of the differential amplifier comprising transistors 62 and 63. Selection of the proper drive levels for cables of various lengths and impedances is well-known to those familiar with the art.

The transistor 62 will be cut off and the transistor 63 will conduct in response to conduction by the transistors 2 and 21. Current from the constant current source 70 will be diverted by the transistor 63 to the input circuit of the common base amplifier 66 to cut the latter off.

Current through resistor 68 due to the conduction of transistor 63 will cause a voltage drop at the emitter of transistor 66. This will bias the transistor 66 to a nonconducting condition. The collector circuit of transistor 66 therefore will assume a negative voltage level determined by the current from voltage source terminal 86 through resistor 87. This relatively negative level is applied to the base of transistor 90, through the bias network comprised of resistors 91 and 94 and voltage source terminal 93. This negative level is applied to the base of transistor 90 to cause said transistor to go into a conducting state. Output terminal 97 therefore will become a current source through the transistor 90, resistor 96, and voltage source terminal 95.

Assume now that a positive data signal is applied to the input terminal 45. This signal will turn the transistor 40 off which will turn the transistor 50 off and the transistor 51 on. The positive and negative levels at the junctions 7 and 26 will turn the transistors 2 and 21 off and the transistors 1 and 20 on. These will in turn produce positive and negative potential levels, respectively, at the base electrodes of the transistors 62 and 63. The transistor 62 will turn on and the transistor 63 will turn off.

Current from the constant current source 70 will be directed by transistor 62 to the constant voltage source terminal 65. This flow of current will keep transistor 63 biased in a nonconducting state. The collector circuit of transistor 63, which is common to the emitter circuit of transistor 66, will tend to go relatively positive due to the positive voltage source at terminal 67. The emitter of transistor 66 will go positive with respect to the base due to the level set at the base by the divider network consisting of resistors 80 and 82 tied between opposite polarity voltage source terminals 81 and 83. The current due to the conducting transistor 66 will be directed through the collector circuit resistor 87 to the voltage source terminal 86. This current flow will cause a voltage drop across the resistor 87 to establish a more positive voltage level at the collector of the transistor 66. This positive voltage excursion will be clamped by the diode 88 to ground potential. This positive level, applied to the base of transistor 90 through the divider network consisting of resistors 91 and 94 to voltage source terminal 93, will cause the transistor 90 to go into a nonconducting state. This presents a high impedance to output terminal 97, i.e., a relatively low or no-current condition at said output.

The purpose of transistor 66 is to decouple the load through a grounded base transistor to provide a constant current source to the load as well as providing an impedance match. The complete terminal network is relatively insensitive to ground shift and voltage variations in the power supplies that provide the positive and negative voltages to the terminal circuit. This can be demonstrated by the fact that transistors 62 and 63 comprising a differential amplifier are insensitive to a change of voltage at point 72 or point 65 or point 67 by virtue of the fact that the conduction of transistor 62 or 63 depends upon the polarity of the signal applied to the terminating resistor 64 and not upon a specific threshold established by the ground potential or power supply voltages. A decrease in the normal 24 volts applied across transistor 62 or 63 in series with transistor 71 will not cause a change in the conducting or nonconducting state of transistor 62 or 63 as long as the decrease in the overall potential difference does not exceed 6 volts.

The conducting or nonconducting state of transistor 66 is likewise insensitive to voltage shifts in the power supplies as seen at terminals 67 and 86. It can be seen that a decrease or increase of voltage at terminal 67 likewise takes place at terminal 81. The bias voltage applied to the base of transistor 66 through the divider network comprised of resistor 80 and 82 will shift in the same direction as the voltage applied to the emitter by virtue of like shifts of voltage points 81 and 67.

The constant current source embodied in transistor 71 in combination with divider network comprised of resistors 74 and 76 is designed to be insensitive to voltage shifts in the power supplies. The resistor network and the emitter resistor are selected to provide an operating point at the collector of transistor 71 such that a shift of less than 6 volts in the power supply will not affect a change in the conducting or nonconducting states of transistors 62 and 63. In the same manner, the values of the resistors 80 and 82 that comprise the divider network that establishes bias for the transistor 66 are selected to be operative within a normal voltage shift of the power supplies associated with the terminal circuit.

A ground shift along the transmission line not greater than ±6 volts will not affect the output of the transistor 66. The ground shift will appear at the collector of the transistor 71 via the base-emitter circuits of the transistors 62 and 63; however, within this range, the transistor 71 provides the same current level to the transistors 62 and 63, whereby the output of the transistor 63 is not affected.

Typical component values of one preferred embodiment which has exhibited particularly reliable results are set forth below; however, it will be appreciated that these values are given by way of example and that the invention is not to be limited thereby. It will also be appreciated that the conductivity types of the various transistors may be changed in a manner well-known in the art so long as their bias and operating potentials are suitably changed to opposite polarities.

RESISTORS

| Number: | Value in ohms |
|---|---|
| **5** | 100 |
| **6** | 100 |
| **10** | 536 |
| **11** | 634 |
| **14** | 10 |
| **15** | 10 |
| **24** | 100 |
| **25** | 100 |
| **29** | 590 |
| **30** | 698 |
| **32** | 10 |
| **33** | 10 |
| **36** | 120 |
| **37** | 1500 |
| **38** | 36000 |
| **39** | 7500 |
| **42** | 392 |
| **43** | 619 |
| **53** | 1000 |
| **54** | 3010 |
| **55** | 1000 |
| **64** | 560 |
| **68** | 360 |
| **73** | 430 |
| **74** | 3600 |
| **76** | 825 |
| **80** | 432 |
| **82** | 2700 |
| **87** | 1800 |
| **91** | 2700 |
| **94** | 11000 |
| **96** | 680 |

CAPACITOR

| Number: | Value, picofarads |
|---|---|
| **92** | 39 |

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Direct current coupled data transmission apparatus comprising
   - a source of bivalued data signals referenced about ground in true and complemented form;
   - a balanced driver including
   - a first pair of transistors of opposite conductivity type having base and emitter electrodes,
   - means for applying the true data signals to both base electrodes,
   - a second pair of transistors of opposite conductivity type having base and emitter electrodes, and
   - means for applying the complement data signals to the latter base electrodes;
   - a transmission line substantially longer than two hundred feet and having two input terminals, two output terminals, and a terminating impedance, one input terminal coupled to the emitter electrodes of one pair of transistors and the other input terminal coupled to the emitter electrodes of the other pair of transistors;
   - a line terminator including
   - a third pair of transistors of the same conductivity type having emitter electrodes coupled to each other, base electrodes each connected to a respective transmission line output terminal, and collector electrodes,
   - means including a transistor providing a constant current source for the latter emitter electrodes, and means operating the third pair of transistors as a differential amplifier;

a load; and means including a transistor coupled to one of the latter collector electrodes applying signals to the load alternatively at one or the other of two constant current levels.

2. Direct current coupled data transmission apparatus comprising:

a transmission line substantially longer than three hundred feet and having a pair of input terminals, a pair of output terminals and a terminating impedance;

a line driver applying bivalued data signals referenced about a predetermined potential level to the input terminals in complemented form at a rate substantially greater than twelve hundred cycles per second, one combination of complemented signal levels corresponding to a logical "1" condition and the other to a logical "0" condition;

a differential amplifier having a pair of control inputs connected to respective line output terminals and responsive to the bivalued data signals for producing output signals corresponding to the logical "1" and "0" conditions of the data signals; and a constant current supply for the differential amplifier rendering the latter insensitive to substantial shifts in ground potential between the input and output terminals of the line.

3. Direct current coupled data transmission apparatus comprising:

a transmission line substantially longer than two hundred feet and having a pair of input terminals, a pair of output terminals and a terminating impedance;

a line driver applying bivalued data signals referenced about a predetermined potential level to the input terminals in complemented form, one combination of complemented signal levels corresponding to a logical "1" condition and the other to a logical "0" condition;

a differential amplifier having a pair of control inputs connected to respective line output terminals and responsive to the bivalued data signals for producing output signals corresponding to the logical "1" and "0" conditions of the data signals; and a constant current supply for the differential amplifier rendering the latter insensitive to substantial shifts in ground potential betwen the input and output terminals of the line.

4. Direct current coupled data transmission apparatus comprising:

a transmission line substantially longer than two hundred feet and having a pair of input terminals, a pair of output terminals and a terminating impedance;

means including a balanced transistor amplifier for applying bivalued data signals referenced about a predetermined potential level to the input terminals in complemented form, one combination of complemented signal levels corresponding to a logical "1" condition and the other to a logical "0" condition;

a differential amplifier having a pair of control inputs connected to respective line output terminals and responsive to the bivalued data signals for producing output signals corresponding to the logical "1" and "0" conditions of the data signals; and a constant current supply for the differential amplifier rendering the latter insensitive to substantial shifts in ground potential between the input and output terminals of the line.

5. Direct current coupled data transmission apparatus comprising:

a transmission line substantially longer than two hundred feet and having a pair of input terminals, a pair of output terminals and a terminating impedance;

a balanced transistor line driver applying bivalued data signals referenced about a predetermined potential level to the input terminals in complemented form, one combination of complemented signal levels corresponding to a logical "1" condition and the other to a logical "0" condition;

a differential amplifier having a pair of control inputs connected to respective line output terminals and responsive to the bivalued data signals for producing output signals corresponding to the logical "1" and "0" conditions of the data signals; and a common base amplifier supplying a constant current to the differential amplifier to render the latter insensitive to substantial shifts in ground potential between the input and output terminals of the line.

6. Data transmission apparatus comprising:

a source of bivalued data signals in true and complement form;

a balanced driver including a first pair of transistors of opposite conductivity type having base and emitter electrodes, means for applying the true data signals to both base electrodes, a second pair of transistors of opposite conductivity type having base and emitter electrodes, and means for applying the complement data signals to the latter base electrodes;

a transmission line substantially longer than two hundred feet and having two input terminals, two output terminals, and a terminating impedance, one input terminal coupled to the emitter electrodes of one pair of transistors and the other input terminal coupled to the emitter electrodes of the other pair of transistors; and a line terminator including a third pair of transistors of the same conductivity type having emitter electrodes coupled to each other, base electrodes each connected to a respective transmission line output terminal, and collector electrodes, means including a transistor providing a constant current source for the latter emitter electrodes, and means operating the third pair of transistors as a differential amplifier to produce output signals corresponding to the bivalued data signals.

7. Direct current coupled data transmission apparatus comprising:

a source of bivalued data signals referenced about ground in true and complement form and having a pulse width duration in the order of one microsecond;

a balanced driver including a first pair of transistors of opposite conductivity type having base and emitter electrodes, means for applying the true data signals to both base electrodes, a second pair of transistors of opposite conductivity type having base and emitter electrodes, and means for applying the complement data signals to the latter base electrodes;

a transmission line substantially longer than two hundred feet but less than ten miles and having two input terminals, two output terminals, and a terminating impedance, one input terminal coupled to the emitter electrodes of one pair of transistors and the other input terminal coupled to the emitter electrodes of the other pair of transistors; and a line terminator including a third pair of transistors of the same conductivity type having emitter electrodes coupled to each other, base electrodes each connected to a respective transmission line output terminal, and collector electrodes, means including a transistor providing a constant current source for the latter emitter electrodes, and means operating the third pair of transistors as a differential amplifier to produce output signals corresponding to be bivalued data signals.

8. Direct current coupled data transmission apparatus comprising:

a transmission line substantially longer than three hundred feet and having a pair of input terminals, a pair of output terminals and a terminating impedance;

a source of binary data signals;

a drive circuit connected to the input terminals and responsive to data signals for effecting a current reversal in the impedance each time the data signals change from one logical condition to the other;

a differential amplifier having a pair of control inputs connected to respective line output terminals and responsive to the current flow in the line for producing output signals corresponding to the data signals; and a constant current supply for the differential amplifier rendering the latter insensitive to substantial shifts in reference potential between the input and output terminals of the line.

9. Direct current coupled data transmission apparatus comprising:

a transmission line extending between locations spaced apart in the range of from one thousand feet to ten miles and having a pair of input terminals, a pair of output terminals and a terminating impedance;

a source of binary data signals having a pulse width duration in the range between one microsecond and five hundred microseconds;

a drive circuit connected to the input terminals and responsive to data signals for effecting a current reversal in the impedance each time the data signals change from one logical condition to the other;

a differential amplifier having a pair of control inputs connected to respective line output terminals and responsive to the current flow in the line for producing output signals corresponding to the data signals; and a constant current supply for the differential amplifier rendering the latter insensitive to substantial shifts in reference potential between the input and output terminals of the line.

10. Direct current coupled data transmission apparatus comprising:

a transmission line extending between locations spaced apart in the range of from one thousand to ten thousand feet and having a pair of input terminals, a pair of output terminals and a terminating impedance;

a source of binary data signals having a pulse width duration in the range between one microsecond and ten microseconds;

a drive circuit connected to the input terminals and responsive to data signals for effecting a current reverals in the impedance each time the data signals change from one logical condition to the other;

a differential amplifier having a pair of control inputs connected to respective line output terminals and responsive to the current flow in the line for producing output signals corresponding to the data signals; and a constant current supply for the differential amplifier rendering the latter insensitive to substantial shifts in reference potential between the input and output terminals of the line.

No references cited.

THOMAS A. ROBINSON, *Primary Examiner.*